United States Patent [19]

Kedem et al.

[11] Patent Number: 5,714,521
[45] Date of Patent: Feb. 3, 1998

[54] ION EXCHANGE MEMBRANES

[75] Inventors: Ora Kedem; Ludmilla Schechtmann, both of Rehovot, Israel

[73] Assignee: Yeda Research and Development Company Ltd., Rehovot, Israel

[21] Appl. No.: 725,437

[22] Filed: Oct. 3, 1996

Related U.S. Application Data

[63] Continuation of Ser. No. 417,761, Apr. 6, 1995, abandoned.

[30] Foreign Application Priority Data

Apr. 7, 1994 [IL] Israel .......... 109240

[51] Int. Cl.[6] .......... C08J 5/22; B01J 47/12; B01D 61/42; B01D 61/46
[52] U.S. Cl. .......... 521/27; 210/490; 210/500.27; 210/500.41; 210/638; 210/641
[58] Field of Search .......... 521/27; 210/638, 210/490, 500.27

[56] References Cited

U.S. PATENT DOCUMENTS

| | | | |
|---|---|---|---|
| 4,673,454 | 6/1987 | Liu | 156/281 |
| 4,911,844 | 3/1990 | Linder | 210/638 |

OTHER PUBLICATIONS

Rubinstein et al., *Desalination*, 69:101–114, 1988.

O. Kedem et al., *Desalination*, 46:185–189, 1983.

O. Kedem et al., *AIchE Symp.*, 248:19–27, 1986.

*Primary Examiner*—Fred Zitomer
*Attorney, Agent, or Firm*—Nikaido Marmelstein, Murray & Oram LLP

[57] ABSTRACT

The invention concerns heterogeneous ion exchange membranes used in electrodialysis which have anti-polarization and anti-fouling properties.

The heterogeneous membranes of the invention comprise, in addition to ion-exchange particles embedded in the matrix, a layer of at least one hydrophilic cross-linked polymer bearing fixed electric charges. Alternatively, the heterogeneous membranes of the invention have a matrix which is itself made of at least one hydrophilic cross-linked polymer.

12 Claims, 4 Drawing Sheets

ION EXCHANGE MEMBRANES

This application is a continuation of application Ser. No. 08/417,761 filed Apr. 6, 1995 now abandoned.

FIELD AND BACKGROUND OF THE INVENTION

The present invention is in the field of electrodialysis and concerns more specifically heterogeneous ion-exchange membranes used therein.

It is known to desalt water by means of electrodialysis (ED) across ion exchange membranes. In an electrodialysis apparatus a pair of anion and cation exchanging membranes define together a diluate cell and the water flowing through such a cell is gradually depleted of much of its native ions such as, for example, $Na^+$, $K^+$ and $Cl^-$, which are transferred into the brine compartment through the cation exchange and anion exchange membrane respectively.

The desalting process in ED takes place at the membrane surfaces adjacent to the diluate solution. When current is passed through permselective membranes, salt is removed from the solution near the diluate surface of the membrane, and enriched near the brine surface. In a continuous process, salt is supplied from the bulk of the diluate solution and removed into the bulk of the brine solution by convection and diffusion. A thin layer of solution adheres to the solid membrane and remains stationary even with fast flow of the bulk solution. In this "unstirred layer" a concentration gradient is established during passage of current. The gradient increases with increasing current density, until the concentration at the membrane surface on the diluate side approaches zero.

From this point onward the electric current, generally referred to as "limiting current" is diffusion limited. It is directly proportional to the bulk concentration of the salt and inversely proportional to the thickness of the unstirred layer and the permselectivity of the membrane.

Such a gradual buildup of a concentration gradient is referred to in the art as polarization. The thickness of the unstirred layer may be reduced by effective mixing and accordingly it has traditionally been assumed that polarization at a given current and accordingly also the limiting current are completely determined by the permselectivity of the membrane and the hydrodynamic conditions in the solution.

However, more recently it was shown that the simple unstirred layer model does not predict the limiting current correctly. Direct measurement of the limiting current under controlled conditions with a series of cation exchanger membranes demonstrated that the limiting current also depends on the nature of the membrane (I. Rubinstein, E. Staude and O. Kedem, *Desalination*, 69, (1988), 101). Model calculations indicate that this is caused by the inhomogeneity of membrane surfaces. Ions enter the membrane phase at a fast enough rate in only a part of the surface and thus the effective local current density is higher than the average measured one. Hence the polarization depends on the conductance of the membrane surface and its distribution.

In anion exchange membranes strong polarization leads to a competing current carrying process: when salt is depleted, protons and hydroxyls derived from the water are transported in a process termed "water splitting". The hydroxyls leave the solution through the anion exchange membrane, and the protons acidify the diluate solution, especially near the membrane surface.

In addition to the current limiting phenomenon of polarization which occurs at both the cation and anion exchange membranes, there is a further current limiting phenomenon known as "fouling", which occurs at the surface of the anion exchange membrane. Fouling is caused nearly exclusively by adsorption of negatively charged colloids on the positively charged anion exchange membrane. If water splitting takes place, the pH near the membrane surface in the diluate is lower than in the bulk and macromolecules carrying weakly acid groups will tend to precipitate on the anion exchanger membrane giving rise to fouling. On the other side of the membrane, the pH will be higher than in the bulk of the brine, thus enhancing the scaling tendency by carbonate.

It is thus seen that in order to increase the efficiency of water desalting by electrodialysis, reduction of the thickness of the unstirred layer by stirring is insufficient and additional measures are required in order to reduce polarization, at both the cation and anion exchange membranes, and avoid water splitting and the consequential fouling and scaling on the anion exchange membranes.

Heterogeneous ion exchange membranes consist of small ion exchange particles embedded in an inert matrix. In this type of membrane the membrane surface is inhomogeneous on a semi-macroscopic scale, and polarization depends on the effective exposure of the ion exchange particles. The performance of heterogeneous ion exchange membranes in electrodialysis is known to be significantly inferior to that of homogeneous membranes, which consist of a polymer or polymer mixture carrying charged groups.

It is the object of the present invention to provide improved heterogeneous ion exchange membranes for use in electrodialysis having anti-polarization and anti-fouling properties.

SUMMARY OF THE INVENTION

In the following description and claims the term "fixed charge" will be used in relation to a membrane or other type of polymer to describe a non-exchangeable electrically charged group and the term "mobile charge" will be used for an ion.

In accordance with the present invention there is provided a heterogeneous ion exchange membrane in which ion exchange particles are embedded in a matrix, comprising a layer of at least one hydrophilic cross-linked polymer bearing fixed electric charges.

If desired the hydrophilic cross-linked polymer or polymers may bear both positive and negative fixed charges.

Where the membrane is cation exchanging, the fixed electric charges on the hydrophilic cross-linked polymer or polymers will be negative and where the membrane is anion exchanging the fixed electric charges will be positive or mixed negative and positive.

In operation, a polymer bearing surface of each of the two cell defining membranes are mounted to face a diluate cell and in this way polarization at both membranes, and fouling and enhancement of water splitting at the anion exchange membrane, are significantly reduced.

It has been shown that the performance in electrodialysis of heterogeneous ion exchange membranes according to the invention is superior to that of the commercially available homogeneous ion exchange membrane.

By one embodiment the heterogeneous ion exchange membrane is made of ion exchange particles embedded in a matrix such as polysulfone or polyethylene and the membrane comprises in addition to said matrix a layer of at least one hydrophilic cross-linked polymer bearing fixed electrical charges.

By another embodiment the present invention provides a heterogeneous ion exchange membrane made of ion exchange particles embedded within a hydrophilic cross-linked polymeric matrix. The hydrophilic cross-linked polymeric matrix may be neutral or optionally bear fixed electric charges, which electric charges may either be of one kind having the same sign as that of the mobile charges particles of the membrane or alternatively may be both positive and negative.

The hydrophilic cross-linked polymer or polymers on the surface of a heterogeneous ion exchange membrane according to the invention is ion conducting. Accordingly, the rate of entrance of the counter-ions into the membrane face in the diluate cell in both cation and anion exchange membranes is considerably enhanced and inhomogeneous depletion of salt near the membrane surfaces is avoided.

For making a heterogeneous ion exchange membrane according to the invention a ready-made hydrophilic polymer or polymers may be applied to a heterogeneous ion exchange membrane and cross-linked, or else polymerization may be carried out in situ. In either case, where the layer constituting hydrophilic cross-linked polymer or polymers does not bear an electric charge, application of the polymer is followed by grafting electrically charged groups such as ammonium, sulfonate and others.

Examples of hydrophilic cross-linked polymers suitable for the purposes of the present invention are polyvinalcohol (PVA) cross-linked by one of various known reactions, cellulosics and polystyrene-sulfonic acid cross-linked by divinyl benzene.

A hydrophilic cross-linked negatively charged polymer can be prepared for example by cross-linking polyvinyl alcohol or cellulosics with reactive dyes carrying sulfonic groups.

A hydrophilic cross-linked positively charged polymer can be prepared by cross-linking with secondary amines.

A hydrophilic, cross-linked and positively charged polymer can also be prepared by embedding small anion-exchange particles in a polymeric matrix such as PVA. As in such a case the fixed positive charge is provided by the anion exchange particles, the cross-linking can be carried out by neutral reagents such as peroxidisulfate leading to carbon-carbon bonds; by dicarboxylic acids forming diesters with some of the hydroxyls on the polymer; etc. The hydrophilic cross-linked polymer or polymers having ion-exchange particles embedded therein are suitable both for forming a distinct layer on a state of the art ion exchange membrane as well as for constituting in themselves an ion exchange membrane of the invention.

Where in an ion exchange membrane according to the invention the hydrophilic cross-linked polymer or polymers are present as a distinct layer on a conventional ion exchange membrane, the polymer can be anchored to the membrane in a number of ways. Generally speaking, a polymeric solution penetrates into the interstices between the ion exchange particles and the inert matrix. The penetration is facilitated if the ion exchange membrane is pre-treated by immersion in water under conditions sufficient to swell the ion exchange particles, thus creating larger openings in the membrane which stay open upon redrying. The hydrophilic polymer is then cast onto the pre-treated ion exchange membrane and enters these openings. (Kedem et al., *AIChE Symph. Series* 248, 82 (1986) 19). Upon re-wetting, the openings in the membranes close, trapping a small amount of hydrophilic polymer which is then cross-linked with the remaining hydrophilic cross-linked polymeric layer thereby anchoring it onto the ion exchange membrane.

Thus, in one embodiment of a heterogeneous ion exchange membrane according to the invention said layer of at least one hydrophilic cross-linked polymer is firmly attached to the heterogeneous membrane substrate by penetration into interstices between ion exchange particles and the matrix.

Attachment of the layer of at least one hydrophilic cross-linked polymeric to the heterogeneous ion exchange membrane can also be achieved by chemical modification of the surface of the membrane matrix, for example, by sulfochlorination on polysulfone (PS), substitution in PVC or grafting on other polymers. The layer of at least one hydrophilic cross-linked polymeric is then cast on the chemically modified ion exchange membrane or is covalently bound thereto.

In a heterogeneous anion exchange membrane according to the invention a hydrophilic negatively charged layer on at least one of the surfaces is capable of blocking or preventing the adsorption of large negatively charged particles while permitting passage of small anions whereby membrane fouling is reduced, and thus serves as anti-fouling means.

In operation, the hydrophilic negatively charged surface of the anion exchange membrane is mounted to face a diluate cell, and its negative charge should be of sufficiently high density to block or prevent adsorption of large negatively charged particles present in the solution, for example, negatively charged particles having a molecular weight of at least 1000 Dalton, and should at the same time be of sufficiently low density to allow the passage of smaller anions. By preventing the adsorption or penetration of large negatively charged ions the phenomena of membrane fouling is significantly reduced if not avoided.

In a preferred embodiment of the invention, a heterogeneous anion exchange membrane comprises an anti-fouling negatively charged layer and an anti-polarizing hydrophilic, cross-linked polymeric layer bearing positive fixed charges. In one form of such a preferred embodiment the anti-fouling negatively charged layer overlays the anti-polarizing hydrophilic, cross-linked positively charged polymeric layer. In another form the said anti-fouling layer is applied to a heterogeneous membrane whose matrix is made of at least one anti-polarizing hydrophilic cross-linked polymer. In yet another form the said anti-fouling layer is applied to a heterogeneous membrane whose substrate is made of a neutral matrix with hydroxyl group containing reactive dyes grafted thereon.

In the above forms of a heterogeneous anion exchange membrane according to the invention the anti-polarizing and anti-fouling layer are cast sequentially. Alternatively, a single mixed charge layer may be produced by casting simultaneously a negatively charged anti-fouling layer and an anti-polarizing positively charged layer on an anion exchange membrane to yield a single layer of mixed charges. An anion exchange membrane having such a mixed charged layer may have lower ion selectivity, but has at the same time both anti-polarizing and anti-fouling properties.

By way of a further example, the anti-polarizing and anti-fouling layer may contain positively charged anion exchange particles which may be introduced into a cross-linked PVA matrix by a small proportion of negatively charged dyes, the ratio of dye to PVA being small. Thus, the outermost layer of the anion exchange membrane has a low density of negative charges preventing membrane fouling by large negatively charged macromolecules but allowing penetration of small anions.

Where the anti-fouling layer is a cross-linked negatively charged polymer cast directly on an anion exchange membrane, anchoring can be performed as described above.

Where the anti-fouling layer is achieved by covalently linking negatively charged groups to the anion exchange membrane, this can be done by a suitable chemical modification for example, by modifying a PVA matrix with negatively charged reactive dyes.

All the methods of membrane fabrication and in situ polymerization, cross-linking and grafting of fixed electric charges are known per se and can be readily performed in relation to ion exchange membranes by a person skilled in the art on the basis of the teachings of the present invention.

DETAILED DESCRIPTION OF THE INVENTION

Example 1

Figure 1:
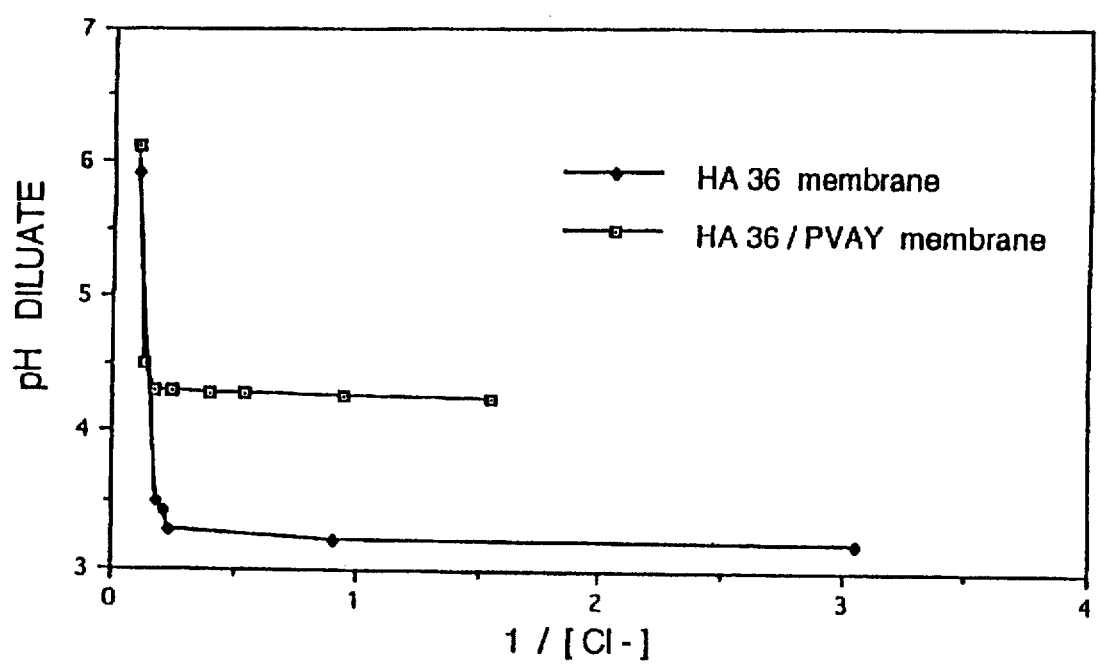
FIG. 1 shows the pH of the diluate as a function of chloride concentration ([miliequivalent/liter]$^{-1}$) in a NaCl solution using an electrodialysis cell having as an anion exchange membrane either HA 36 ([●]) or HA 36/PVAY (♦)

(A) Preparation of heterogeneous cation exchange membranes

Heterogeneous cation exchange membranes were cast on a Dixon machine from solutions containing N-methylpyrrolidone (NMP). The NMP solutions also contained ground cation exchange resin (sulfonated copolymer of styrene and divinyl benzene produced by Purolite, USA, PA) suspended in a polysulfone (PS) solution at an amount of 14 parts per 100 ml giving a final ratio of ion exchanger to matrix (PS) of 1.4.

The above casting solution was deposited by dipcoating on a Polyester supporting fabric (ESTAL 6™, Schweizer Seidengase, Switzerland). A second layer composed of the same materials but having an ion exchanger to matrix ration of 1.8 was coated onto the first layer with a coating knife, having opening of 150μ. The membrane thus produced was termed "HC 55".

The HC 55 membrane had the following properties after immersion in a salt solution:

Membrane potential separating 1N/2N NaCL solutions: $\Delta\phi=14$ mV

Resistance in 0.5 NaCl: R=5.5 $\Omega$cm$^2$.

(B) Coating by a hydrophilic layer

The HC 55 membrane prepared as described above was immersed in water and redried. The hydrophilic coating was prepared by forming a casting solution having the following composition: 3.6 gr polyvinyl alcohol (PVA) (Elvanol 71-30™, DuPont, U.S.A.), 1.4 gr reactive dye—Cibacron Yellow (Ciba-Geigy, Switzerland), 3 gr wetting agent (ethyleneglycol-mono butyl ester) in 100 ml of aqueous solution. The above solution was knife-coated with a knife having 0.2 mm opening onto the HC 55 membrane. The coated membrane was dried at 90° C., and heated for one hour in an aqueous solution containing 5% of Na$_2$CO$_3$ and 3% of Na$_2$SO$_4$ at 80° C. to complete the crosslinking.

The membrane obtained was termed "HC 55/PVA" and had the following properties after immersion in a salt solution:

Membrane potential in 1N/2N NaCl: $\Delta\phi=15.5$ mV.

Resistance in 0.5N NaCl: R=3.0 $\Omega$cm$^2$.

It appears that the negatively charged, hydrophilic, crosslinked PVA penetrated into the interstices between the ion exchange particles and improved the penetration of the cations through the cation exchange membrane as evident from the lowering of membrane resistance.

Example 2

(A) Preparation of heterogeneous anion exchange membranes

A heterogeneous anion exchange membrane was prepared on a Dixon casting machine. Small anion exchange resin particles were prepared by chloromethylation of crosslinked polystyrene spheres, 200 mesh (Ponty-bond™, produced by Pontyclun, U.K.). These particles were suspended in PS solution in NMP, in an amount of 14 parts per 100 ml. Weight ratio of ion exchanger to matrix (PS) was 1.3. This casting solution was coated on a polyester woven support fabric as described above in Example 1. A second layer having a similar composition but containing ground anion exchanger to matrix in a ratio of 1.5 was knife-coated onto this membrane.

The membrane prepared as described above was termed "HA-36".

(B) Coating by a hydrophilic layer

A HA-36 membrane prepared as described above was immersed in water and redried. A hydrophilic coating was prepared by forming a casting solution having the following composition: an aqueous solution of PVA 8w %, was prepared. A fine fraction of "Purolite PrAOH" was prepared by sedimentation, and converted to Cl– form. The wet powder was dispersed in water. This suspension was mixed with PVA solution to give the final composition of 5 gr PVA and 9 gr ion-exchanger (dry weight) in 100 ml of casting solution. The solution obtained was cast on an anion exchange membrane HA-36 prepared as described above.

The coated membrane (HA36/PVA) was used as anion exchange membrane in an experiment as described below. Desalting a 0.001N NaCL solution to 0.5 mM, the final pH was 4.0.

(C) Coating by a mixed charged layer

Another coating solution was prepared having the following composition: 5.5 gr of the anion exchange powder described in (B) above, 3.6 gr PVA and 0.9 gr Cibacron yellow in 100 ml of aqueous solution. The particles were thoroughly dispersed in a PVA solution and the dye solution was added immediately before casting. The HA-36 membrane prepared as described in (A) above was coated with the above coating by a coating knife having an 0.2 mm opening and was then dried and immersed for an hour in a crosslinking media as described in example 2(B) and the coated membrane was termed "HA-36/PVAY".

(D) Testing of anion exchange membrane

A single flow-through electrodialysis cell was prepared wherein the dialysate was confined by the cation exchange membrane described in Example 1. The anion-exchange membrane used was one of the membranes described in (A), (B), or (C) of Example 2. Membrane area was 25 cm$^2$.

A sodium chloride solution was used for desalting. Initial concentration of the diluate solution was 0.01N NaCl and brine 0.1N NaCl. The current used was 10 mA/cm$^2$.

HA-36 anion-exchange membrane prepared in A desalted to 0.33 nM giving a final pH of diluate 3.2.

HA-36/PVA anion-exchange membrane prepared in B desalter to 0.5 mM giving a final pH of 4.0.

HA-36/PVAY anion-exchange membrane prepared in C desalted to 0.6 mM giving a final pH of 4.3.

As can be seen from the above results, an anion exchange membrane having a hydrophilic positive layer (HA-36/PVA) had better desalting properties than an uncoated anion exchange membrane (HA-36) probably due to reduction of polarization.

An anion exchange membrane having both a hydrophilic positive layer as well as a positive and negative mixed charges (HA-36/PVAY) had still better desalting properties probably due to the fact that such a membrane can effectively reduce polarization.

FIG. 1 shows the pH of the diluate solution as a function of the reciproke of the chloride concentration, using as a cation exchanger membrane either HA-36 or the coated membrane HA-36/PVAY. As can be seen in FIG. 1, HA-36/PVAY having the hydrophilic layer containing positive charges and the mixed charge layer was able to better suppress the water splitting as compared to the uncoated membrane.

Example 3

Preparation of a Mixed Charge Membrane

A mixed charge membrane was prepared by the following procedure: a first casting solution containing 15.5 gr dry anion exchange powder (Purolite A-430 I.P.), 5.7 gr ground CaCO$_3$, suspended in a solution of 14 gr polysulfone in 100 ml NMP/ethanol (9:1). This was cast by hand on the polyester supporting fabric as described in Example 1 above, and dried at 90° C. for 1 hour. The dry membrane was immersed overnight in 1N HCl, dissolving the carbonate and leaving a porous membrane.

A second casting solution contained 4 gr PVA, 1 gr Cibacrome Yellow and 3 gr butylcellosolve in 100 ml water was prepared. This solution was knife-cast on the porous layer described above and dried at 90° C. Crosslinking was completed in solution containing Na$_2$CO$_3$ and NA$_2$SO$_4$ as in Example 1. The membrane thus prepared was termed "AM/PVA".

Desalting experiments were carried out as described in Example 2(D) above with the above AM/PVA membrane serving as the anion exchange membrane. As control the same experiments were carried out with a Selemion AMV anion-exchange membrane (Asahi Glass, Japan).

Figure 2:
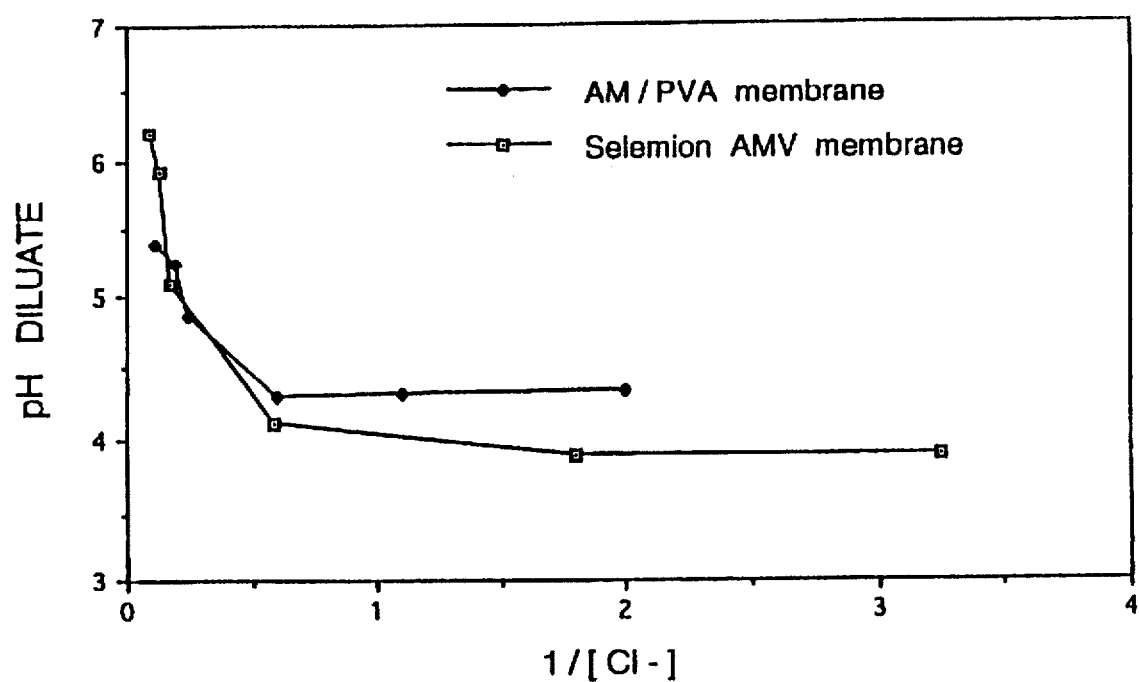
FIG. 2 shows the pH of the diluate as a function of chloride concentration ([miliequivalent/liter]$^{-1}$) in a NaCl solution using an electrodialysis cell having as an anion exchange membrane either Selemion AMV, (producted by Asahi Glass, Japan) (♦) or AM/PVA ([●])

FIG. 2 shows the pH of the diluate solution as a function of reciproke of the chloride concentration using both membranes. As can be seen the AM/PVA membrane suppressed water splitting as compared to standard Selemion AMV anion exchange membrane.

Example 4

Determination of Fouling Using Polyacrylic Acid

Polyacrylic acid (PAA) was used as a model for membrane fouling by large, negatively charged particles.

An electrodialysis cell prepared as in Example 2(D) above was used, the cation exchange membrane being HC 55/PVA and the anion exchange membrane was AMV Selemion. After desalting, the final pH of the diluate at 0.3 mM was 3.9.

The desalting experiment was repeated, adding to the feed 10 ppm of PAA. The diluate was desalted from 10 mM to 5 mM and the pH decreased to 3.3.

In order to clear the PAA molecules adsorbed on the anion exchange membrane a current of 10 mA/cm$^2$ was passed in the opposite direction for three hours using a solution of NaCl 0.4N, and Na$_2$CO$_3$ 0.1N in lieu of the diluate. The cell was then thoroughly rinsed and desalting of 0.01 NaCl solution, under the same conditions as described above, was repeated. After partly desalting to 7.5 mM the pH of the diluate was 3.0. The fact that water splitting remained high indicated that the layer of PAA adsorbed onto the standard anion exchange membrane could not be removed by the reverse current, this being in line with the well known phenomenon of membrane fouling.

The experiment described above was repeated with an AM/PVA membrane serving as the anion exchange membrane. Desalting of 0.01N NaCl was carried out adding 10 ppm of PAA. At a diluate concentration of 0.47 mM the pH was 4.1. A current of 10 mA/cm$^2$ was passed in the opposite direction for two hours using a solution of 0.5N NaCl and 0.1N Na$_2$CO$_3$ in lieu of the diluate.

After rinsing, desalting of 0.01 NaCl was repeated. At diluent concentration of 0.5 mM the pH was 4.1 All desalting properties of the anion exchange membrane were recovered after passing the reverse current, including low water splitting, showing that either PAA was not adsorbed at all or that all PAA adsorbed was desorbed by the reverse current.

Example 5

Preparation of Heterogeneous Anion Exchange Membrane in a Matrix of Hydrophilic Crosslinked Polymer A casting solution was prepared, containing small anion exchange particles, used in Example 2(B), in an aqueous solution of PVA in an amount of 5 gr PVA and 9 gr anion exchanger in 100 ml aqueous solution.

The solution was dipcast on polyester supporting fabric ESTAL 6™, and dried at 90° C. A second layer was applied by knife coating with a knife having 0.2 mm opening. The resulting membrane was dried and then cured at 115° C. for 90 minutes. The cured membrane was insoluble in hot water, being crosslinked by the dehydration of the PVA.

The membrane was used as anion exchange membrane in the ED cell used above, and desalting of 0.01N NaCl solution was carried out at 10 mA/cm$^2$. The pH at 2 mM was 3.8, rising again to 4.3 at the final concentration of 0.33 mM.

Example 6

(A) Coating of heterogeneous cation exchange membrane

A heterogeneous cation exchange membrane comprising a polyethylene matrix (Ionpure, U.S. Filter) was conditioned in a hot solution of concentrated NaCl.

A coating solution having the following composition was prepared: 5.5 gr PVA, 2.5 gr Procion Red (MX-5B), 2.5 ml of butylcellosolve (b.c.) and water to complete to 100 ml.

Part of the NaCl conditioned membrane was coated with two thin layers of the above coating solution and dried at 80° C. The coated and dried membrane was immersed in a solution of 0.5N Na$_2$CO$_3$ and 0.5N Na$_2$SO$_4$ at 70° C. for 2 hours.

Coated and uncoated membranes were compared and had the following properties after immersion in a salt solution:

|  | Uncoated | Coated |
|---|---|---|
| Membrane resistance in 0.5N NaCl | 25 Ωcm$^2$ | 17.5 Ωcm$^2$ |
| Membrane potential in 1N/2N NaCl | Δφ = 11.3 mV | Δφ = 15.5 mV |

It is evident that the coated solution improved permselectivity and membrane conductance probably by penetrating into the interstices between the cation exchange particles.

(B) Coating of heterogeneous anion exchange membrane

A heterogeneous polyethylene-based anion exchange membrane was divided into two parts, one was conditioned as described in Example 6(A), and the other was conditioned with a solution of 0.5% PVA in concentrated NaCl under the same conditions.

Two coating solutions were prepared having the following compositions:

Solution I: 5 gr PVA, 10 gr finely ground anion exchange resin (Purolite A425), 2 gr hexamethoxymethylmelamine (Cymel™, Cyanamide, USA) 0.1 ml 0.1N H$_2$SO$_4$ and water to complete to 100 ml.

Solution II: Cibacron Yellow CR 0.1, 0.5% in water.

Solution I was cast on the membrane part conditioned with PVA and was dried at 70°–80° C.

A second layer consisting of Solution II was cast on the same membrane and dried at 80° C. Finally the coated and dried membrane was immersed, in a solution of 0.5 Na$_2$CO$_3$ and 0.5 Na$_2$SO$_4$ at 70° C. for 2 hours.

Coated and uncoated membranes were compared and had the following properties after immersion in a salt solution:

|  | Uncoated | Coated |
|---|---|---|
| Membrane resistance in 0.5N NaCl | 15.4 Ωcm$^2$ | 16.8 Ωcm$^2$ |
| Membrane potential in 1N/2N NaCl | Δφ = 5.0 mV | Δφ = 7.0 mV |

As can be seen there was little change in the above two membrane properties, probably due to the fact that the polymer which penetrated into the interstices was neutral.

The change of properties due to coating is expected to be evident in the polarization properties while passing a current.

(C) Testing of coated membranes

A single flow-through electrodialysis cell was prepared having the membrane area, brine and diluate compositions as specified in Example 2(D). The anion exchange and cation exchange membranes in one experiment were the coated membranes of Examples 6(A) and 6(B) above and in another experiment uncoated heterogeneous anion exchange and cation exchange membranes. Current parameters were as specified in Example 2(D).

Figure 3:
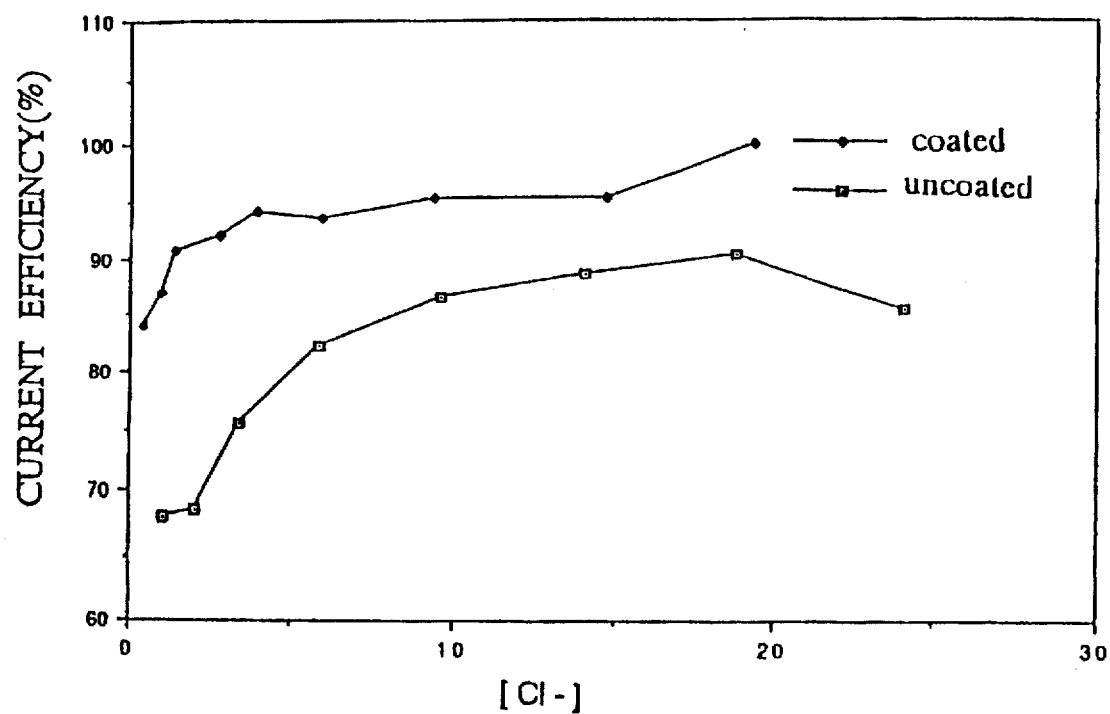
FIG. 3 shows the current efficiency (in %) as a function of chloride concentration ([miliequivalent/liter]) in NaCl solution using an electrodialysis cell having either uncoated ([●]) or coated (♦) membranes.
Figure 4:
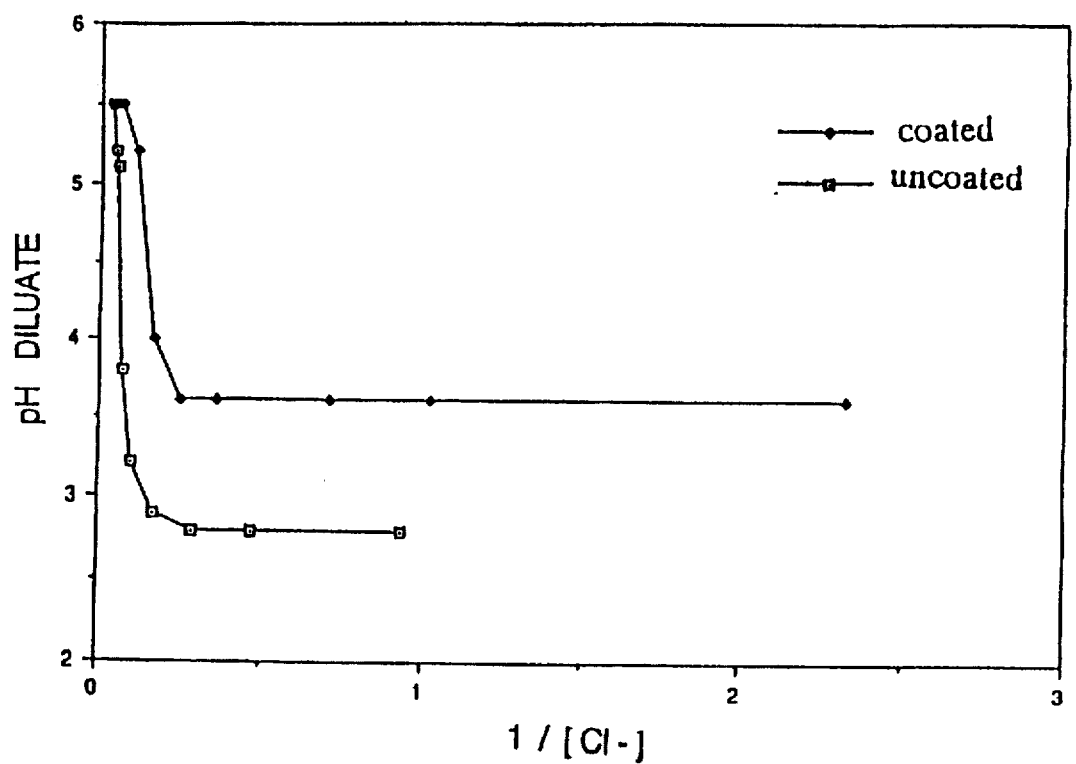
FIG. 4 shows the pH of a diluate as a function of chloride concentration ([miliequivalent/liter]$^{-1}$) in NaCl solution using an electrodialysis cell having either uncoated ([●]) or coated (♦) membranes.

FIG. 3 shows the current efficiency of coated (♦) or uncoated ([●]) membranes in percent as a function of chloride concentration in the diluate. FIG. 4 shows the pH of the diluate as a function of salt concentration for coated (♦) or uncoated ([●]) membranes. As can be seen, water splitting was substantially suppressed by the coating under the same conditions of current and flow.

We claim:

1. A heterogeneous electrodialysis ion exchange membrane exhibiting anti-polarizing and anti-fouling properties in which ion exchange particles are embedded in an inert matrix, comprising a layer of at least one hydrophilic cross-linked polymer, said layer bearing fixed electric charges.

2. A heterogeneous ion exchange membrane according to claim 1, wherein said layer of at least one hydrophilic cross-linked polymer layer is firmly attached to the membrane substrate by penetration into interstices between ion exchange particles and the matrix.

3. A heterogeneous ion exchange membrane according to claims 1 or 2, wherein said layer of at least one hydrophilic cross-linked polymer bears negative fixed electric charges.

4. A heterogeneous ion exchange membrane according to claims 1 or 2, wherein said layer of at least one hydrophilic cross-linked polymer bears positive fixed electric charges.

5. A heterogeneous anion exchange membrane according to claim 4, wherein said layer of at least one hydrophilic cross-linked polymer bears mixed electric charges.

6. A heterogeneous ion exchange membrane according to claim 1, wherein said matrix is made of polysulfone.

7. A heterogeneous ion exchange membrane according to claim 1, wherein said matrix is made of polyethylene.

8. A heterogeneous ion exchange membrane according to claim 1, being an anion exchange membrane having at least on one surface a hydrophilic, negatively charged layer.

9. An anion exchange membrane according to claim 3, wherein the hydrophilic negatively charged layer is made of at least one cross-linked polymer.

10. An anion exchange membrane according to claim 3, wherein the hydrophilic negatively charged layer comprises negatively charged polymers covalently linked to the membrane.

11. An anion exchange membrane according to claim 3, capable of blocking large negatively charged particles having a molecular weight of at least 1000 Dalton.

12. An anion exchange membrane according to claim 3, capable of preventing the adsorption of particles having a molecular weight of at least 1000 Dalton.

* * * * *